US00RE39659E

(19) United States
(12) Reissued Patent
Luciano, Jr. et al.

(10) Patent Number: US RE39,659 E
(45) Date of Reissued Patent: May 29, 2007

(54) GAMING DEVICE WITH MULTIPLE SPINNING WHEELS AND METHOD

(75) Inventors: Robert A. Luciano, Jr., Reno, NV (US); Lawrence W. Luciano, Sommerville, NJ (US); Kurt W. Spencer, Reno, NV (US)

(73) Assignee: Sierra Design Group, Las Vegas, NV (US)

(21) Appl. No.: 10/767,960

(22) Filed: Jan. 30, 2004

Related U.S. Patent Documents

Reissue of:
(64) Patent No.: 6,561,512
Issued: May 13, 2003
Appl. No.: 09/757,384
Filed: Jan. 8, 2001

U.S. Applications:
(63) Continuation-in-part of application No. 09/527,705, filed on Mar. 17, 2000
(60) Provisional application No. 60/174,988, filed on Jan. 7, 2000, and provisional application No. 60/126,052, filed on Mar. 23, 1999.

(51) Int. Cl.
*G07F 17/34* (2006.01)
*A63F 9/00* (2006.01)

(52) U.S. Cl. ..... 273/142 HA; 273/142 H; 273/143 R; 273/309; 273/138.2; 463/20

(58) Field of Classification Search ..... 273/142 HA, 273/142 H, 143 R, 138.1, 138.2, 142 R, 273/309, 280; 463/20, 46
See application file for complete search history.

(56) References Cited

U.S. PATENT DOCUMENTS 5,024,439 A 6/1991 Okada
5,106,091 A 4/1992 Comito
5,145,181 A 9/1992 Welman et al.
5,395,111 A 3/1995 Inoue
5,630,586 A 5/1997 Lowden
5,839,955 A 11/1998 Mangano et al.
6,105,962 A 8/2000 Malavazos et al.

FOREIGN PATENT DOCUMENTS

GB 2117546 10/1983
GB 2165074 4/1986

*Primary Examiner*—Benjamin Layno
(74) *Attorney, Agent, or Firm*—Brown Raysman Millstein Felder & Steiner LLP

(57) ABSTRACT

The specification discloses a multi-wheel game-of-chance having at least two groups of spinning wheels, wherein each group includes at least two concentric spinning wheels having a viewable surface face thereon. A plurality of indicia are positioned on the peripheral of the viewable surface face of each wheel such that all indicia on each wheel is viewable to the user. Bet areas are positioned at various locations around at least a portion of each group of wheels; along a line joining the center of any two groups of wheels; and/or a junction between various radially positioned lines extending from the center of two or more groups of wheels. Each bet area represents a possible payline with various pay ratios depending on the probability of various predetermined combinations. For instance, a one-group combination payline has the lowest pay ratio; a two-group payline requires the combination from two groups of wheels and thus, has a higher pay ratio than a one-group payline; and as additional group combination paylines are added, the higher the pay ratio can become.

22 Claims, 14 Drawing Sheets

| SYMBOLS | SINGLE PAYLINE | DOUBLE PAYLINE | TRIPLE PAYLINE |
|---|---|---|---|
| 7 | 10 | 100 | 1000 |
| TRIPLE BAR | 8 | 16 | 32 |
| DOUBLE BAR | 2 | 4 | 8 |
| BAR | 1 | 2 | 4 |
| BLANK | 0 | 1 | 2 |

GAMING DEVICE WITH MULTIPLE SPINNING WHEELS AND METHOD

Matter enclosed in heavy brackets [ ] appears in the original patent but forms no part of this reissue specification; matter printed in italics indicates the additions made by reissue.

CROSS REFERENCE TO RELATED APPLICATIONS

This application claims priority of and incorporates by reference U.S. provisional patent application No. 60/174,988, filed Jan. 7, 2000. [This application is also a continuation-in-part application of U.S. application Ser. No. 09/638,866, filed Aug. 15, 2000, now U.S. Pat. No. 6,376,893, which is a continuation application of U.S. patent application Ser. No. 09/212,108, filed Dec. 15, 1998, now U.S. Pat. No. 6,105,962.] This application is further a continuation-in-part application of U.S. patent application Ser. No. 09/527,705, filed Mar. 17, 2000, which claims the benefit and priority of U.S. provisional application No. 60/126,052, filed Mar. 23, 1999.

FIELD OF THE INVENTION

This invention relates to devices and methods for playing games. More specifically, this invention relates to a device and method for playing a game of chance wherein indicia on a plurality of spinning wheels or representations of wheels are combined along one or more pay lines to produce a game outcome.

BACKGROUND

The gaming industry has long been trying to develop gaming devices that are more exciting and enjoyable to play. When gaming devices are more exciting and enjoyable, they tend to be played more by players and they tend to generate more revenue for the gaming device operator or provider.

For example, spinning reel gaming devices are well known in the prior art and have long been a staple of the gaming industry. These games utilize one or more actual or apparent cylindrical reels that spin around an axis in response to the player's activation of the game. Game symbols are displayed on the outer circumference of the reels. Typically, the game is won and a prize is awarded when the game symbols on the reels provide a particular predetermined outcome shown when the reels stop spinning. As a result, a three-wheel game might provide a large award to the player if the outcome is three bars in a row displayed by the three co-axial and adjacent reels, as viewed by the player.

For wagering game tables, however, there have been much fewer tables that utilize spinning reels. One such example that has become well known in the industry is roulette. Roulette uses a wagering mat and a single separated spinning reel having a plurality of numbered receiving channels positioned peripherally around the center of the reel. Players place wagers on the wagering mat at one or more positions, wherein each position has a predetermined pay ratio depending on the probability of winning. The dealer then places a ball on an upper inwardly-angled edge of the reel and the reel is spun. As the reel slows and the centrifugal force on the ball becomes less than the gravitational force, the ball rolls toward the center of the reel and is captured in one of the numbered receiving channels, thereby indicating the winning wagers, if any.

These spinning reel games can be made more exciting to the player, and thus more likely to be played, by addition of features such as flashing lights, sounds, double bonus time-periods, and progressive linking of multiple such games to a common jackpot in addition to the local jackpot for each machine on its own. These methods of making spinning reel games more exciting and more utilized are well known in the art. However, they still present the game player with only a limited number of winning combinations.

With regard to roulette or spinning wheel games in the prior art, they typically also have the wheels mounted at their axial center on axial drive shafts. Mounting and rotating the wheel on an axial drive places significant stress on the drive shaft and associated drive and support structure. Also, an axial mount and drive mechanism is typically noisy and easily damaged or moved off-center during use or installation or movement of the game apparatus. Axial mounting also occupies significant space for the axial drive behind the wheel, and it requires significant additional and complicated structure in order to drive multiple concentric wheels independently.

One of the disadvantages of spinning reel gaming devices is that they only allow a player to see a small number of game symbols on the reels. Because of the physical curvature of a reel, it is generally only possible for a view of the symbols of on a reel to be within a players view. This is not the case with wheels. Wheels may have annular surfaces around the entire circumference of a wheel. Therefore, wheels can display a greater number of symbols than reels.

BRIEF SUMMARY OF THE INVENTION

The present invention comprises a wagering device that includes at least two groups of spinning wheels, wherein each group includes at least two concentric spinning wheels having a viewable surface face thereon. A plurality of indicia are positioned on the periphery of the viewable surface face of each wheel such that all indicia on each wheel is viewable to the user. Bet areas are positioned at various locations around at least a portion of each group of wheels; along a line joining the center of any two groups of wheels; and/or a junction between various radially positioned lines extending from the center of two or more groups of wheels. Each bet area represents a possible pay line with various pay ratios. For instance, a bet area directly outside a single group of wheels has the lowest pay ratio since only the indicia in line with the wheels of that group and the bet area must match a predetermined winning combination. A bet area along a pay line joining the center of two groups of wheels requires a predetermined winning combination indicia on all wheels in both groups and thus, has a higher pay ratio than a single wheel group pay line. A bet area that is a junction between three center lines, for example, of three groups of wheels would have an even higher pay ratio due to the lower probability associated with the predetermined winning combination needed from all three wheels in all three groups.

There are many other aspects of the invention that are apparent from this. For example, any combination of two or more groups of wheels may be utilized. In addition, any number of two or more wheels may be utilized in each group. As another example, in the preferred embodiment, three groups of wheels, each group having three concentric wheels, are evenly positioned in a generally clover formation such that the two-group pay lines joining the center of each group form a generally isosceles triangle, and wherein the highest three-group combination bet area is generally formed at the center of the isosceles triangle with pay lines extending to the center of each group.

ADVANTAGES OF THE INVENTION

It is therefore an advantage of the present invention to provide a game-of-chance apparatus and method that is more exciting for the player and thus more likely to be played.

It is another advantage of the present invention is that it allows players to place wagers on many different outcomes of a single game.

It is another advantage of the present invention to provide a table-wagering game that is utilized more than prior art games and thus generates more revenue and profits for the game owner and gaming establishment.

It is another advantage of the present invention to provide a "spinning reel" look and feel for a game that is utilized more than prior art games and thus generates more revenue and profits for the game owner and gaming establishment.

Yet another advantage is to provide a table-wagering game that can be played with a multitude of players and with or without a live operator.

Yet another advantage is to provide a "slot machine" type of game, thus allowing the game to be played at any time by one player and without any help from any other player or operator.

Yet another advantage of the present invention is that it provides a wagering game-of-chance apparatus having a plurality of spinning wheels grouped in a plurality of groups thereby providing a multitude of wagering opportunities and pay lines and, thus a multitude of possible winning combinations.

A still further advantage is that the invention provides such a game in which the multiple wheels are concentric and preferably rotate or stop rotation in sequence.

A further advantage is that the invention provides a multi-wheeled game that is quieter and more durable and long lasting than prior multi-wheeled games. A related advantage is providing such a game with a more precise yet relatively simple drive mechanism for driving independent rotation of the wheels. A still further related advantage is providing such multi-wheeled game with resilient and reliable radial drive gears. Another advantage is providing a multi-wheeled game in which the wheel drive need not occupy as much space as conventional axial drive wheel games.

A further advantage of the present invention is that it provides a multi-wheeled game apparatus and method in which the multiple wheels can all be viewed by the player without moving from place to place and, preferably, are all mounted together in a manner that occupies approximately the same floor space as a traditional, single game slot machine or table game.

There are other advantages of the present invention. They will become apparent as the specification proceeds.

In this regard, it is to be understood that the scope of the present invention is to be determined by reference to the accompanying claims, and not necessarily by whether any given embodiment achieves all of the objects or advantages stated herein.

BRIEF DESCRIPTION OF THE DRAWINGS

The preferred embodiment of the present invention is described in the following section by reference to the accompanying drawings, in which.

DETAILED DESCRIPTION OF THE PREFERRED EMBODIMENT

In the following detailed description of the preferred embodiments, reference is made to the accompanying drawings, which form a part of this application. The drawings show, by way of illustration, specific embodiments in which the invention may be practiced. It is to be understood that other embodiments may be utilized and structural changes may be made without departing from the scope of the present invention.

Figure 1:
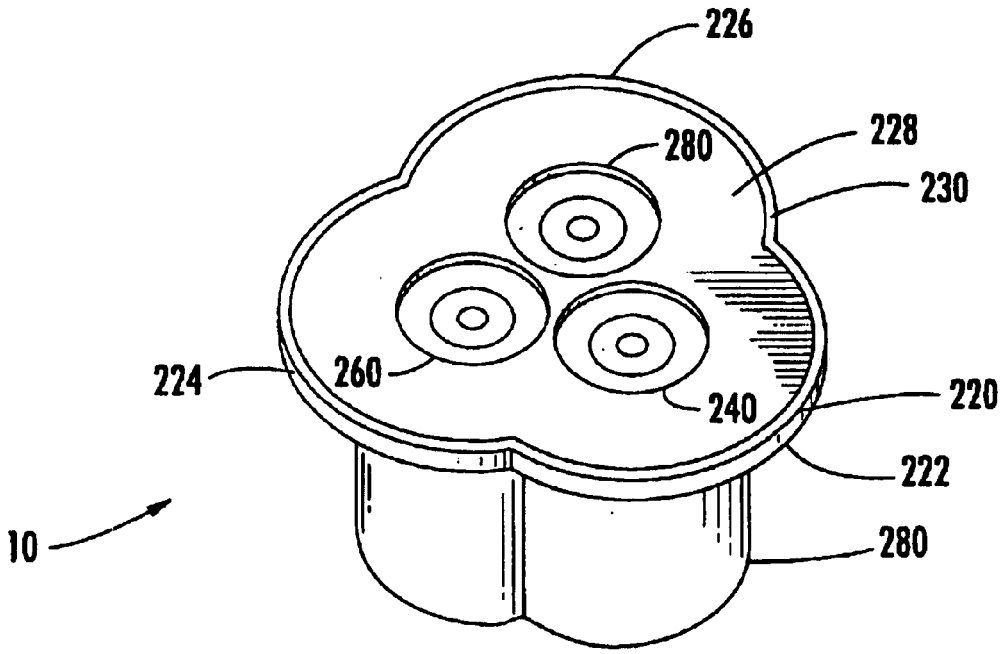
FIG. 1 is substantially a perspective view of the applicant's multi-wheel game apparatus shown in the preferred embodiment as a game table.
Figure 2:
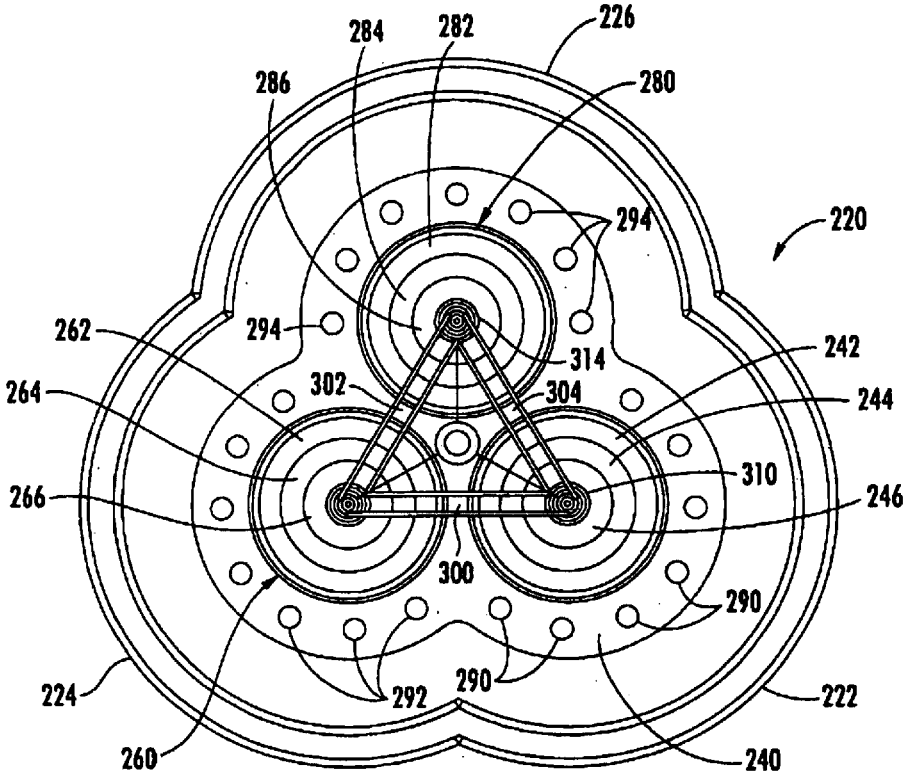
FIG. 2 is substantially a plan view of the multi-wheel game shown in FIG. 1.
Figure 3:
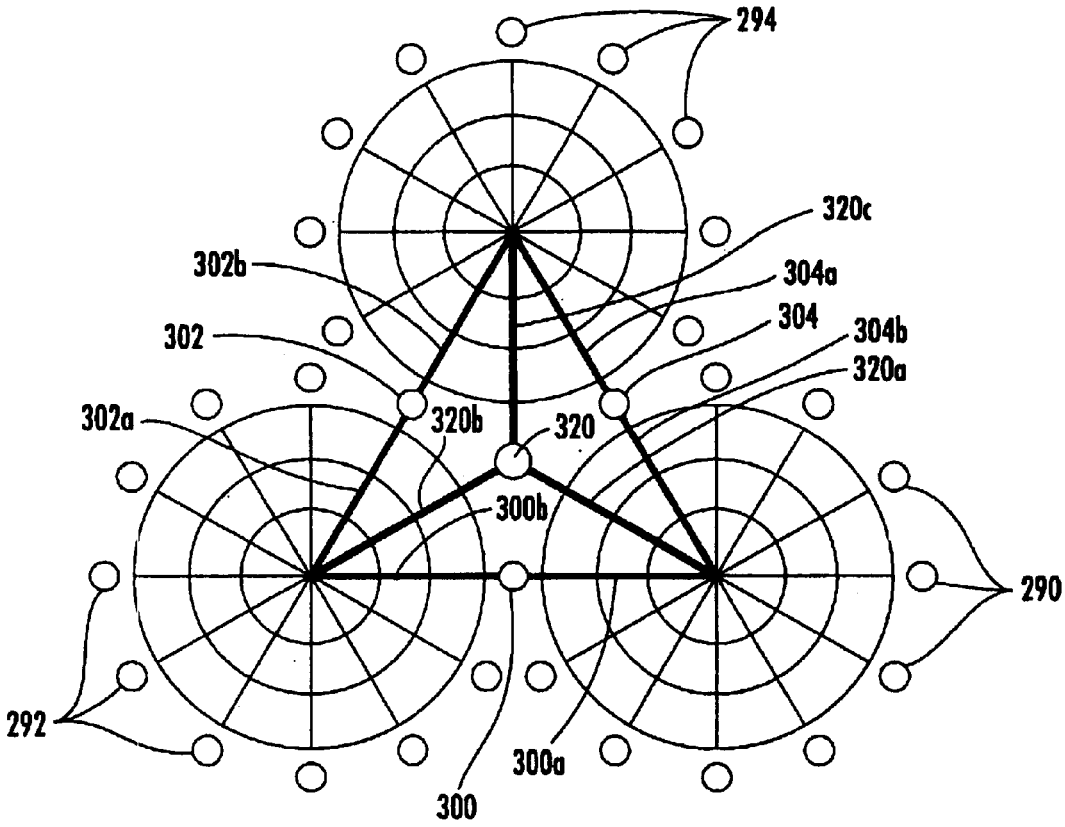
FIG. 3 is substantially a plan view of the betting areas and paylines in the multi-wheel game of FIG. 1.

Referring now to FIGS. 1–3, the preferred embodiment, generally indicated by reference number 10, comprises a gaming device having generally an upper playing area 220 and a lower support base 280. The upper playing area 220 is defined by a playing surface 228 having a first lobe 222, a second lobe 224 and a third lobe 226, which together generally form a clover shape. However, it is recognized that many other shapes may be used. A ridge 230 may be provided that extends upward from and on the peripheral of the playing surface 228.

Positioned generally at the center of the playing surface 228 in an approximate clover positioning are preferably three groups 240, 260, and 280 of concentric wheels. The first group 240 is preferably positioned at least partially within the first lobe 222; the second group 260 is preferably positioned at least partially within the second lobe 224; and the third group 280 is preferably positioned at least partially within the third lobe 226. Each group 240, 260 and 280 are preferably equally spaced apart such that a line drawn connecting the centers of each group 240, 260, and 280 forms an isosceles triangle. The present invention is intended to encompass a fewer number of groups and wheels. For example, only two groups of wheels may be used or only two non-concentric wheels may be used and still be within the present invention. Furthermore, the overall configuration of gaming device 10 may be different and still be within the present invention. For example, groups one or more of groups 240, 260, and 280 may be in a vertical position instead of a horizontal position. The present invention is also intended to encompass non-mechanical wheels. Wheels can be represented by electronic display devices, such as a video screen or lights.

In the preferred embodiment, each group 240, 260, and 280 comprises three concentric wheels, each having a visible annular surface positioned upward from the playing surface 228. More specifically, the first group 240 preferably comprises a first wheel 242, a second wheel 244 and a third wheel 246, wherein the visible annular surface of the first wheel 242 has a larger diameter than the visible annular surface of the second wheel 244, and wherein the visible annular surface of the second wheel 244 has a larger diameter than the visible annular surface of the third wheel 246 such that the visible annular surfaces on all three wheels 242, 244 and 246 can be seen by a player.

Similar to the first group 240, the second group 260 preferably comprises a first wheel 262, a second wheel 264 and a third wheel 266, wherein the visible annular surface of the first wheel 262 has a larger diameter than visible annular surface of the second wheel 264, and wherein the visible annular surface of the second wheel 264 has a larger diameter than the visible annular surface of the third wheel 266 such that the visible annular surfaces on all three wheels 262, 264 and 266 can be seen by a player.

Similar to the first group 240 and the second group 260, the third group 280 preferably comprises a first wheel 282, a second wheel 284 and a third wheel 286, wherein the visible annular surface of the first wheel 282 has a larger diameter than the visible annular surface of the second wheel 284, and wherein the visible annular surface of the second wheel 284 has a larger diameter than the visible annular surface of the third wheel 286 such that the visible annular surfaces on all three wheels 282, 284 and 286 can be seen by a player.

Now referring to FIG. 3, various symbols or indicia 19, which together can form various winning combinations, are provided at spaced-apart radial positions on the visible annular surfaces of each wheel 242, 244, 246, 262, 264, 266, 282, 284, and 286. A plurality of wager locations 290, 292, 294, 300, 302, 304 and 320 corresponding to various pay lines are positioned on the playing surface 228 proximal to the wheel groups 240, 260, and 280, wherein wager locations 290, 292 and 294 are single group wagers; wager locations 300, 302 and 304 are double group wagers; and wager location 320 is a triple group wager. More specifically, wager locations 290 are positioned at least partially around the peripheral of first group 240; wager locations 292 are positioned at least partially around the peripheral of second group 260; and wager locations 294 are positioned at least partially around the peripheral of second group 240. A single group wager on the first group 240 is won when predetermined symbols or indicia line up along the respective pay line on the first wheel 242, the second wheel 244 and the third wheel 246 are combined to match a predetermined winning combination. A single group wager on the second group 260 is won when predetermined symbols or indicia line up along the respective pay line on the first wheel 262, the second wheel 264 and the third wheel 266 are combined to match a predetermined winning combination. A single group wager on the third group 280 is won when predetermined symbols or indicia 19 line up along the respective pay line on the first wheel 282, the second wheel 284 and the third wheel 286 are combined to match a predetermined winning combination.

Double group wager locations 300, 302, and 304 require a winning combination from two of the three group. For instance, wager location 300 is positioned between first group 240 and second group 260 such that symbols or indicia 19 along pay line 300a of wheels 242, 244, and 246 and pay line 300b of wheels 262, 264, and 266 must match a predetermined winning combination in order for wager location 300 to be a winning location. Similarly, wager location 302 is positioned between second group 260 and third group 280 such that symbols or indicia 19 along pay line 302a of wheels 262, 264, and 266 and pay line 302b of wheels 282, 284, and 286 must match a predetermined winning combination in order for wager location 302 to be a winning location. Similarly, wager location 304 is positioned between third group 280 and first group 240 such that symbols or indicia 19 along pay line 304a of wheels 282, 284 and 286 and pay line 304b of wheels 242, 244, and 246 must match a predetermined winning combination in order for wager location 304 to be a winning location.

Triple group wager location 320 is preferably positioned equally spaced between the first group 240, the second group 260 and the third group 280. Pay lines 320a, 320b and 320c extend from the wager location 320 to the center of first group 240, second group 260 and third group 280, respectively, and as such, a winning combination requires a matching combination from all nine wheels 242, 244, 246, 262, 264, 266, 282, 284, and 288 along the respective pay lines 320a, 320b, and 320c. Because a triple group winning combination has the lowest probability, a triple group wager has the highest pay ratio, and, conversely, a single group wager has the lowest pay ratio.

Figure 13:
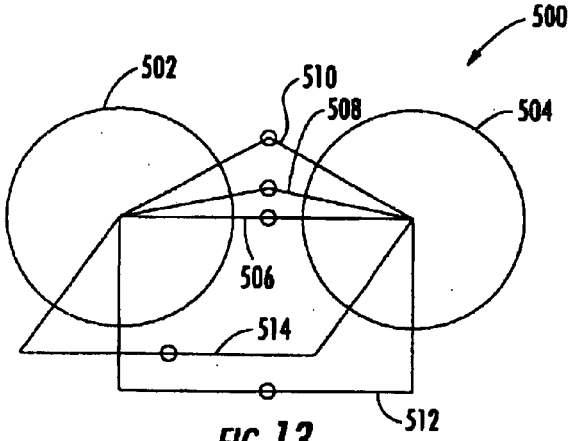
FIG. 13 is substantially a diagram of possible pay lines for a two-wheel configuration of the present invention.

As seen in FIG. 13, the present invention comprises an embodiment that utilizes only two wheels. In this embodiment, wheels 502 and 504 are adjacent to each other an at least one pay line is provided. Pay line 506 may be similar to pay lines 300, 302, and 304 shown in FIG. 3. However, in this embodiment, only two wheels are used. Wheels 502 and 504 do not contain concentric groups. Pay lines 508, 510, and 512 are symmetrical combinations of radial pay lines. Non-symmetrical combinations of radial pay lines may also be provided, such as pay line 514.

Figure 14:
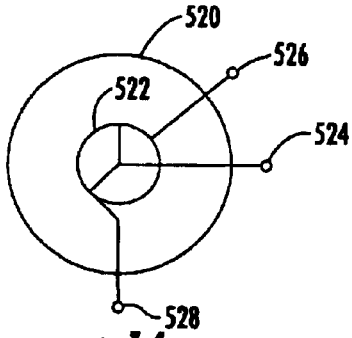
FIG. 14 is substantially a diagram of two different pay lines that may be used with the present invention.

FIG. 14 illustrates linear and non-linear radial pay lines for a group of concentric wheels. In this embodiment, at least two wheels are provided, 520 and 522. Pay line 524 radiates linearly outward while pay lines 526 and 528 radiate non-linearly outward. Linear and non-linear radial pay lines may be combined with other types of pay lines with other wheels.

Figures 15, 16:
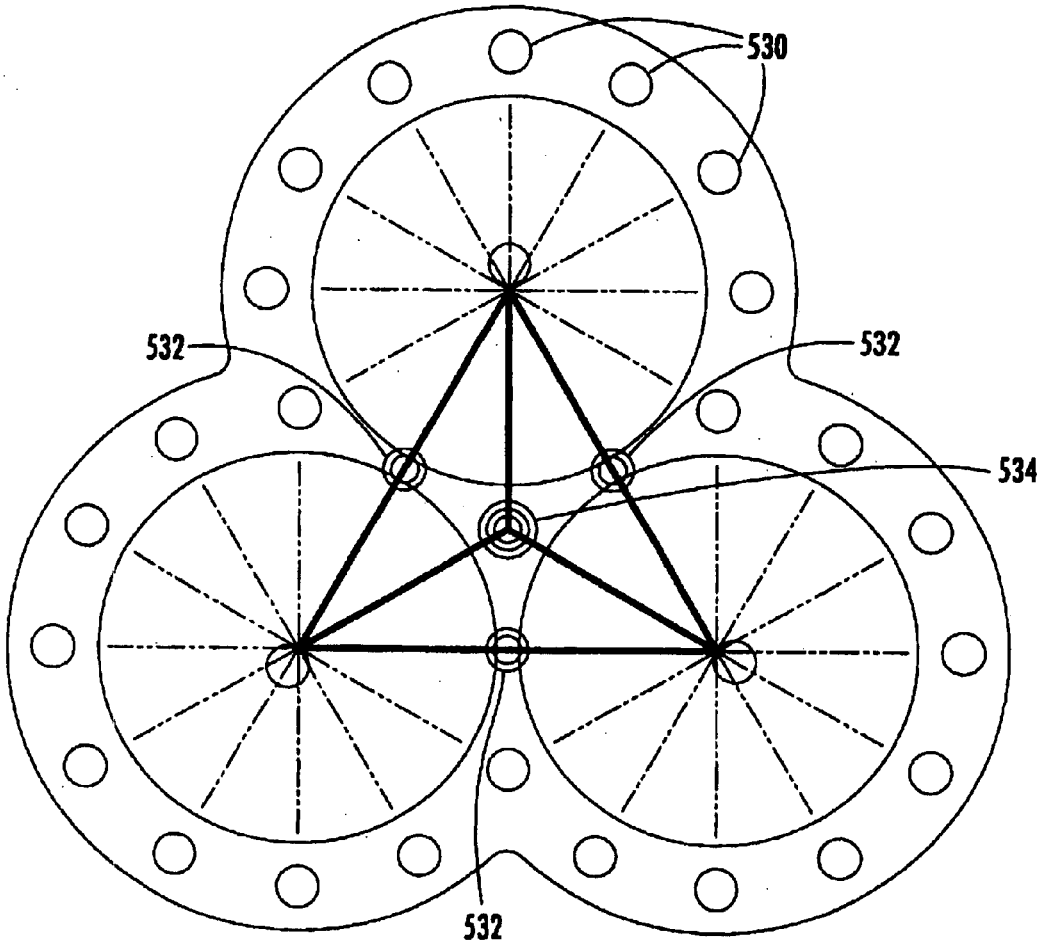
FIG. 15 is substantially a diagram of an embodiment of the present invention that utilizes three single wheels.
FIG. 16 is substantially an example of a pay table that may be used with the embodiment illustrated in FIG. 15.

FIG. 15 discloses an embodiment that utilizes three single wheels (no groups of concentric wheels). In this embodiment, the pay lines are similar to the those disclosed in FIG. 3. Bet positions 530 correspond to single pay lines, bet positions 532 correspond to double pay lines, and bet positions 534 correspond to triple pay lines.

FIG. 16 represents an example of a pay table that may be used with the embodiment disclosed in FIG. 15. For example, if a player placed a wager on a double pay line (532) and the positions on the pay line contained double bars (after the wheels had been spun), the player would be paid 4 credits.

Figure 17:
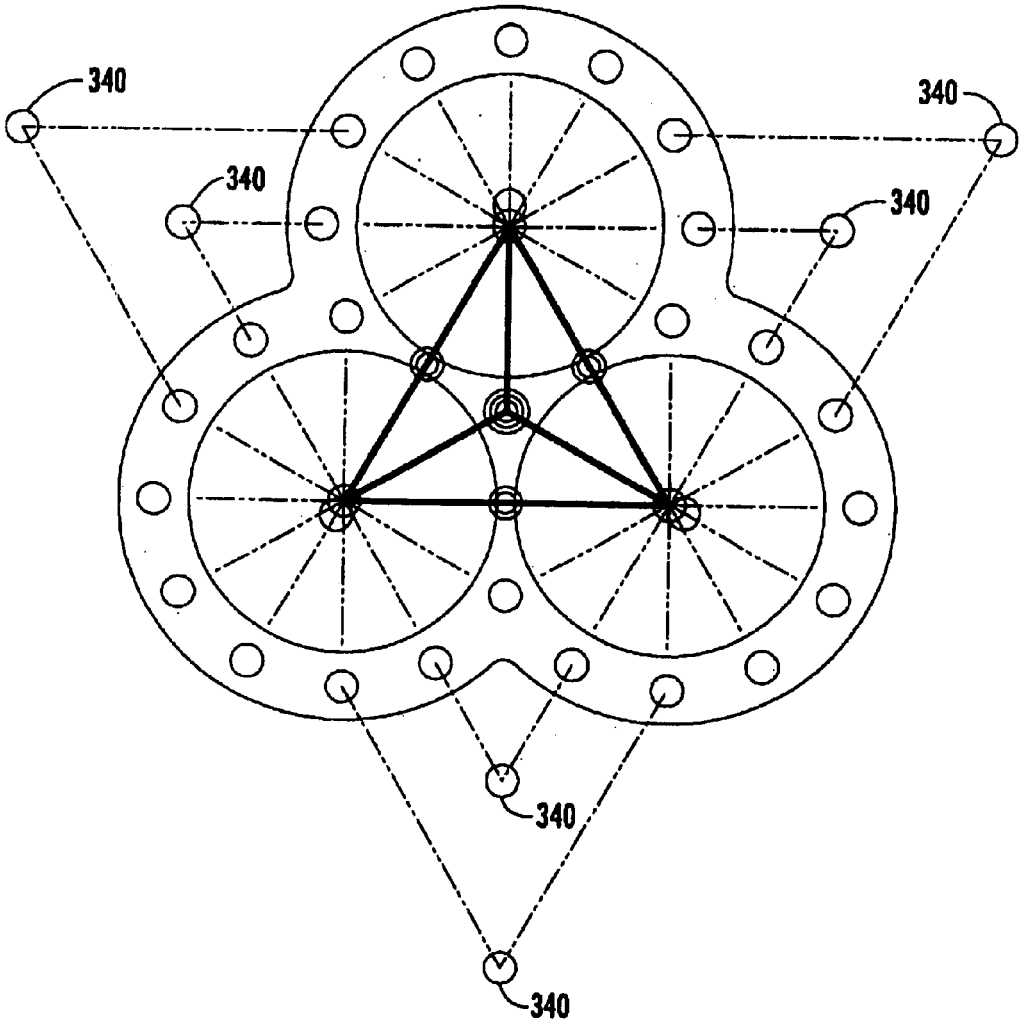
FIG. 17 is substantially a diagram of an embodiment of the present invention that utilizes three single wheels and V-shaped pay lines.

FIG. 17 illustrates an embodiment that utilizes V-shaped pay lines 340. V-shaped pay lines 340 combine two or more symbols from different wheels.

Figure 18:
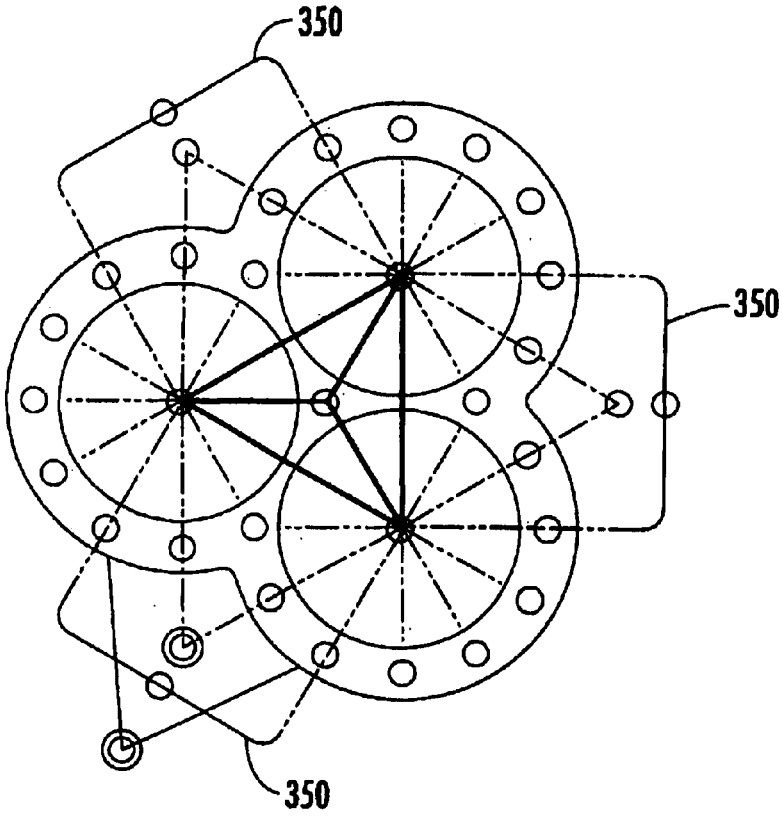
FIG. 18 is substantially a diagram of an embodiment of the present invention that utilizes rectangular shaped pay lines.

FIG. 18 illustrates an embodiment that utilizes rectangular pay lines 350. Rectangular pay lines 350 also combine two or more symbols from different wheels.

Figure 19:
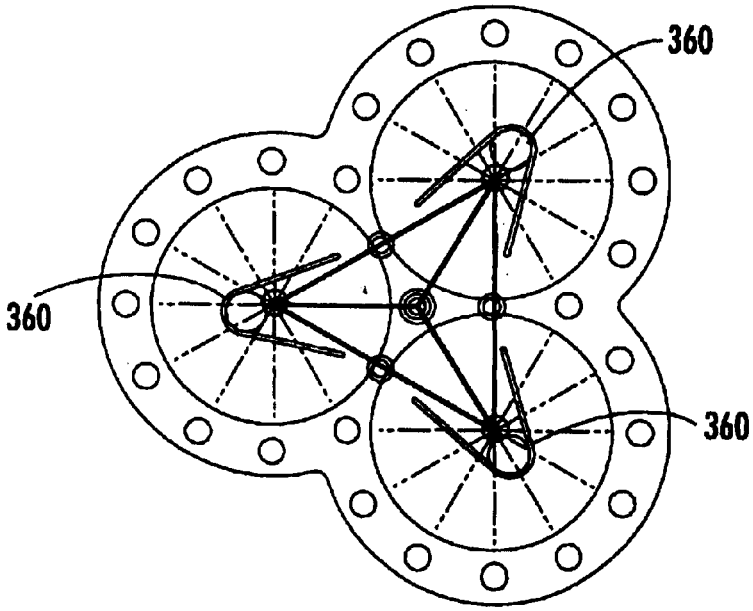
FIG. 19 is substantially a diagram of an embodiment of the present invention that utilizes single wheel V-shaped pay lines.

FIG. 19 illustrates an embodiment that utilizes single wheel V-shaped pay lines 360. In this embodiment, pay lines 360 combine two or more symbols on the same wheel.

Figure 11A:
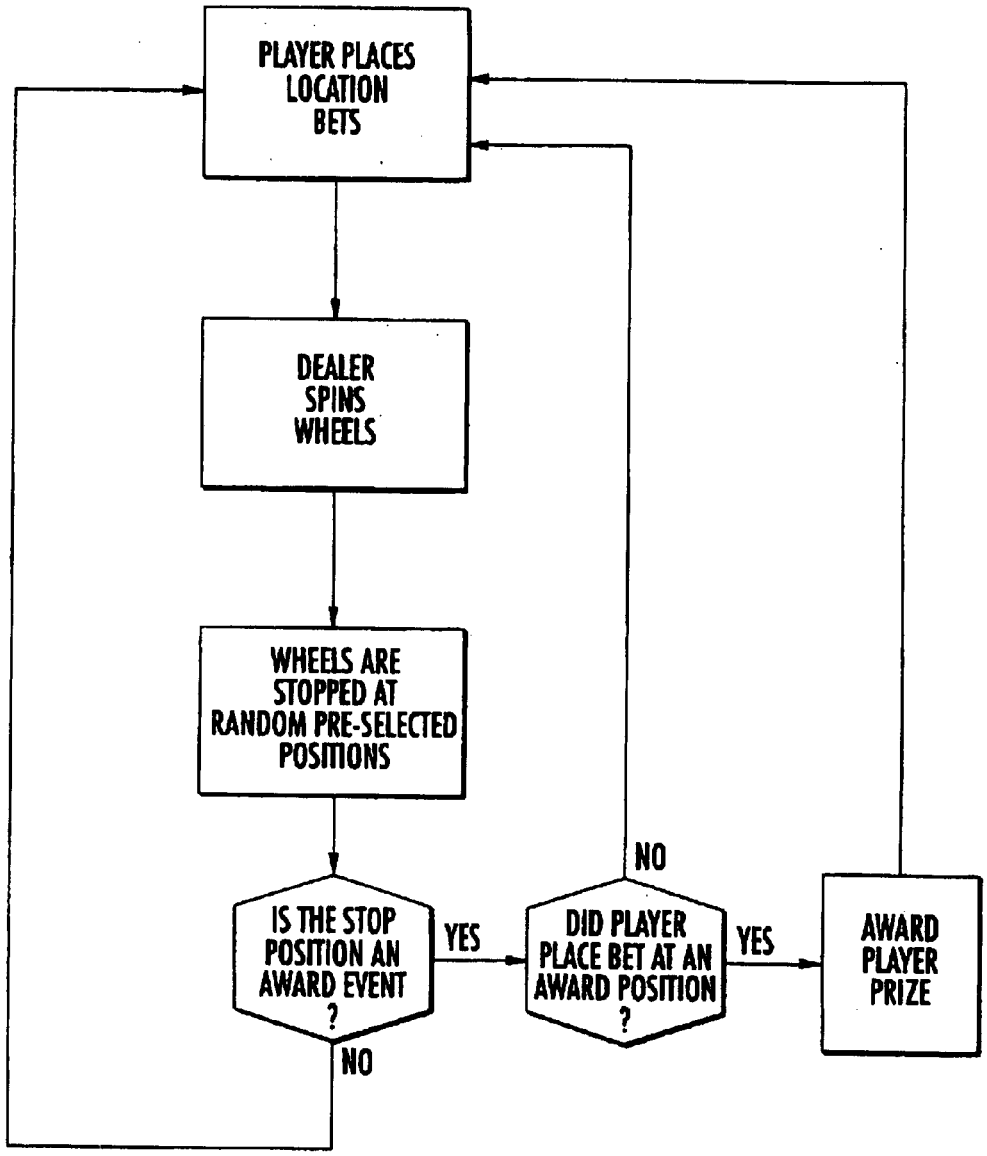
FIG. 11a is substantially a flow chart of the preferred method of playing the preferred multi-wheel game with the assistance of a dealer.

Now referring to FIG. 11a, in the preferred manual form, a dealer tends the bets and activates the wheels. The wheels are stopped in wheel stopping positions. The stopping positions may be determined in a number of ways that are well known in the art. For example, a computer may be provided that randomly generates numbers. When a number is generated, it it is compared with a wheel stopping position table that contains all of the possible stopping positions for all of the wheels. The wheels are then stopped in the positions that correspond to the random number selected by the computer. Alternatively, a random number may be generated for each wheel and the stopping position of each wheel may be independently determined. The dealer then evaluates the wins based on the combination of symbols or indicia 19 and rewards the player(s) accordingly.

Now referring to FIG. 11a, in the preferred manual form, a dealer tends the bets and activates the wheels. The wheels are stopped in wheel stopping positions. The stopping positions may be determined in a number of ways that are well known in the art. For example, a computer may be provided that randomly generates numbers. When a number is generated, it is compared with a wheel stopping position table that contains all of the possible stopping positions for all of the wheels. The wheels are then stopped in the positions that correspond to the random number selected by the computer. Alternatively, a random number may be generated for each wheel and the stopping position of each wheel may be independently determined. The dealer then evaluates the wins based on the combination of symbols or indicia 19 and rewards the player(s) accordingly.

Figure 11B:
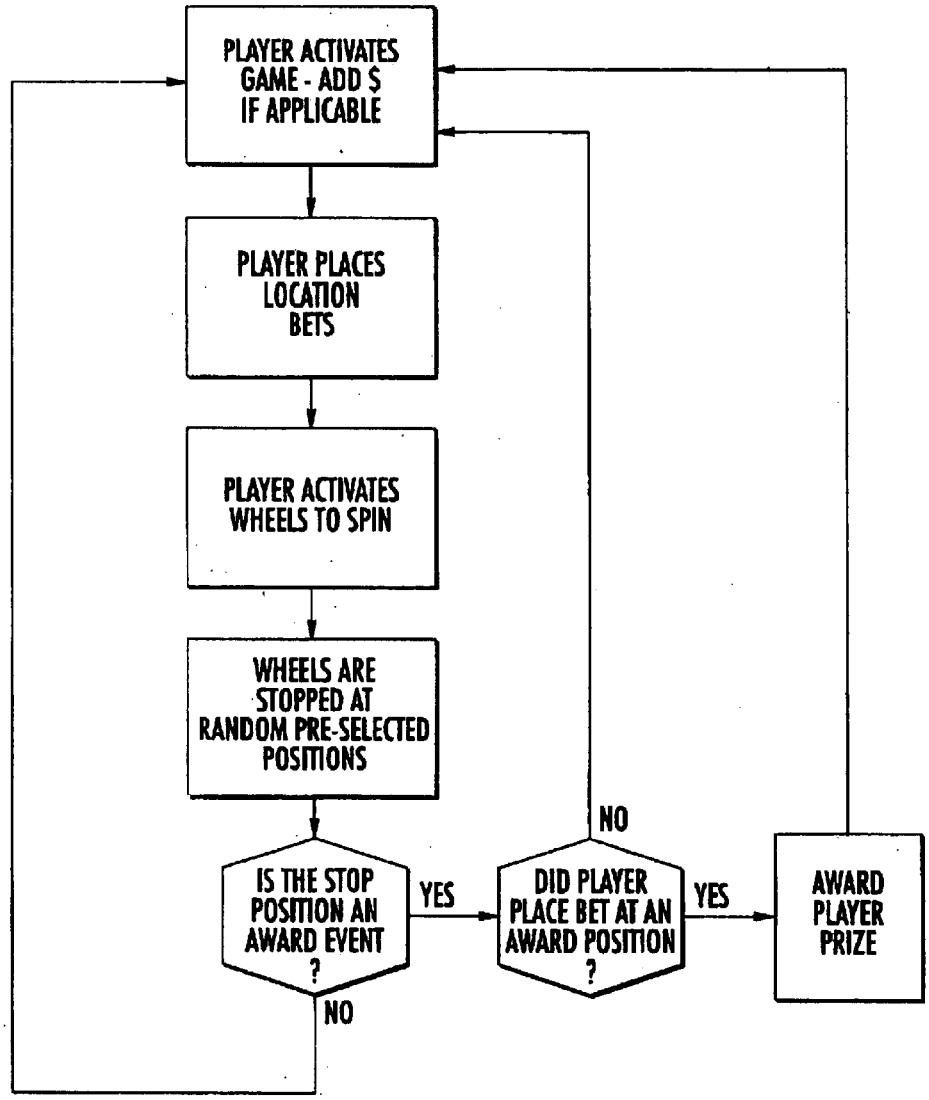
FIG. 11b is substantially a flow chart of the method of playing the preferred multi-wheel game without the use of a dealer.

With continuing reference to FIG. 11b, a microprocessor controller may evaluate the combination of symbols or indicia 19 and award prizes to player(s) accordingly. Various pay ratios can be utilized; for exemplary purposes only, a 1:1 pay ratio can be utilized for a single group winning combination, a 3:1 pay ratio can be utilized for a two group winning combination, and a 10:1 pay ratio can be utilized for a three group winning combination.

Figure 4:
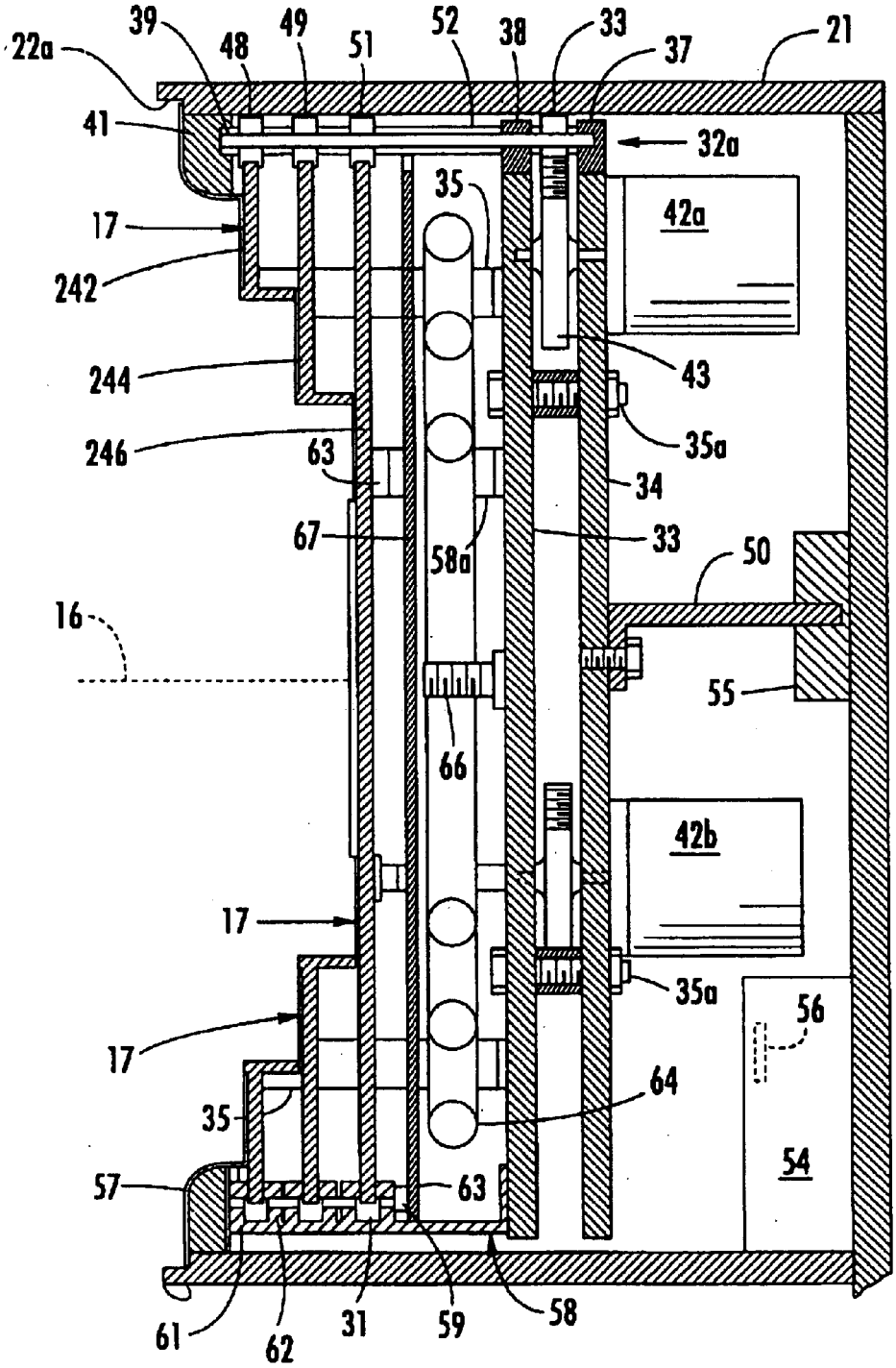
FIG. 4 is substantially an elevation section view of the drive system for one group of the multi-wheel game of FIG. 1.
Figure 5:
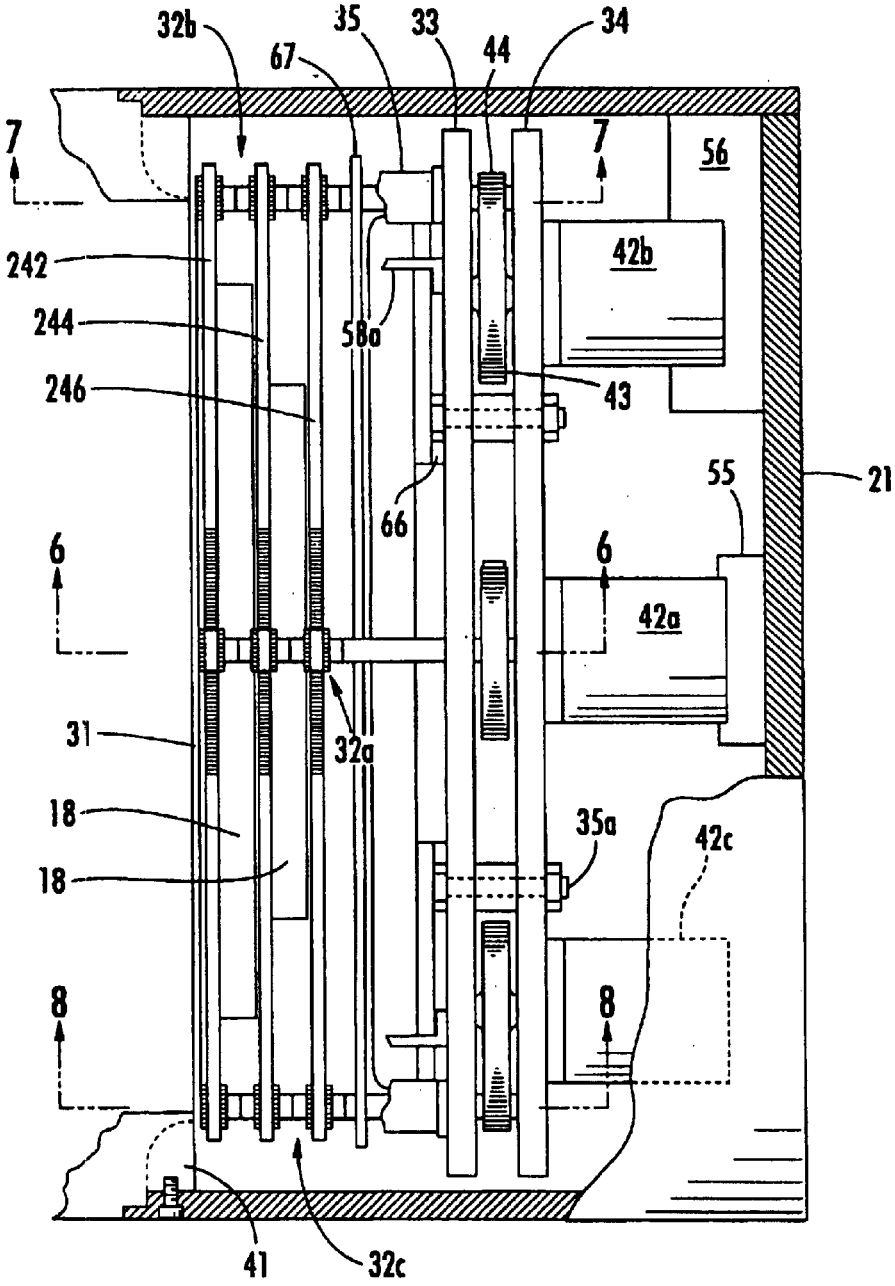
FIG. 5 is substantially a broken out top view of the drive system for one group of the multi-wheel game of FIG. 1.

Each group 240, 260 and 280 is preferably rotated by a separate drive mechanism that spins each wheel of each group and stops each wheel of each group in a position determined by a controller. As each driving mechanism is identical for each group 240, 260 and 280, only the driving mechanism for the first group 240 is herein described in detail. Referring jointly to FIGS. 4 and 5, the periphery of each of the wheels 242, 244 and 246 is provided with gear teeth 31. The wheels 242, 244, and 246 are positioned, supported and driven by a compact and simple mechanism that includes three gear sets 32a, 32b, and 32c, which engage the gear teeth 31. The gear sets 32a, 32b, and 32c are situated adjacent to the peripheral region of the wheels 242, 244, and 246 and are angularly spaced apart relative to the axis of rotation 16 of the wheels. The angular interval between the gear sets 32a, 32b, and 32c around the axis of rotation 16 is less than 180 degrees for reasons that will hereinafter be discussed, and is preferably 120 degrees as in this particular example of the invention.

Figure 6:
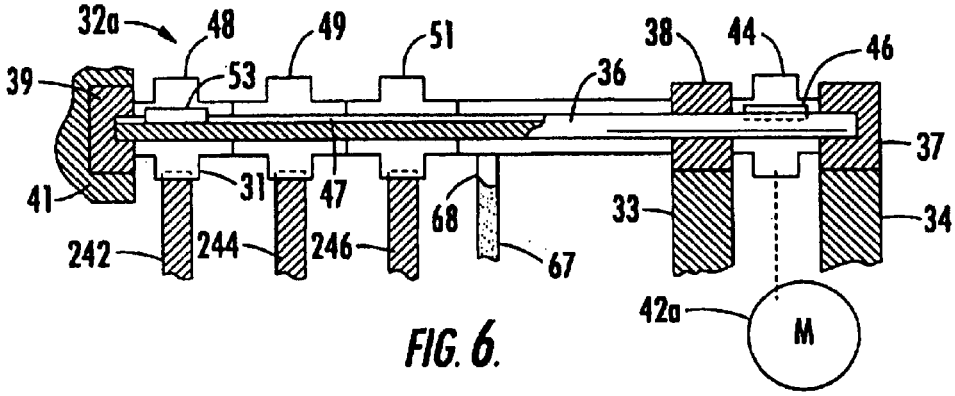
FIG. 6 is substantially a section view taken along line 6—6 of FIG. 5.

A pair of spaced apart circular support plates, including a forward support plate 33 and rear support plate 34, extend vertically behind the wheels 242, 244, and 246. Bolts 35 secure the two support plates together. Referring jointly to FIGS. 4 and 6, each of the gear sets 32a, 32b, and 32c has a rotatable drive shaft 36 which extends from a back end bearing 37 mounted in the rear support plate 34 through a bushing 38 mounted in the forward support plate 33 to a front end bearing 39 mounted in an annular front structural member 41. The drive shaft 36 of each gear set 32a, 32b, and 32c is driven by a separate one of three electric motors 42a, 42b and 42c which are situated behind the rear support plate 34 and secured to that support plate. Each such motor 42a, 42b, and 42c turns a motor output gear 43 situated between the forward and rear support plates 33 and 34 and which engages a smaller driven gear 44 situated on the drive shaft 36 of the associated one of the gear sets 32a, 32b, and 32c at a location between the support plates. The drive shafts 36 are constrained to rotate with the driven gears 44 in this example by keys 46 within the driven gears that sent in longitudinal keyway slots 47 that extend along each drive shaft. Alternately, the driven gears 44 may be locked to the drive shafts 36 by setscrews or other means known to the art.

Figure 7:
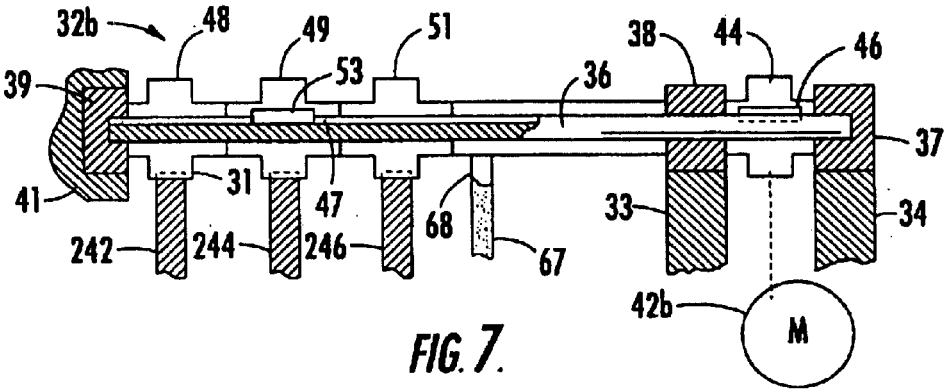
FIG. 7 is substantially a section view taken along line 7—7 of FIG. 5.
Figure 8:
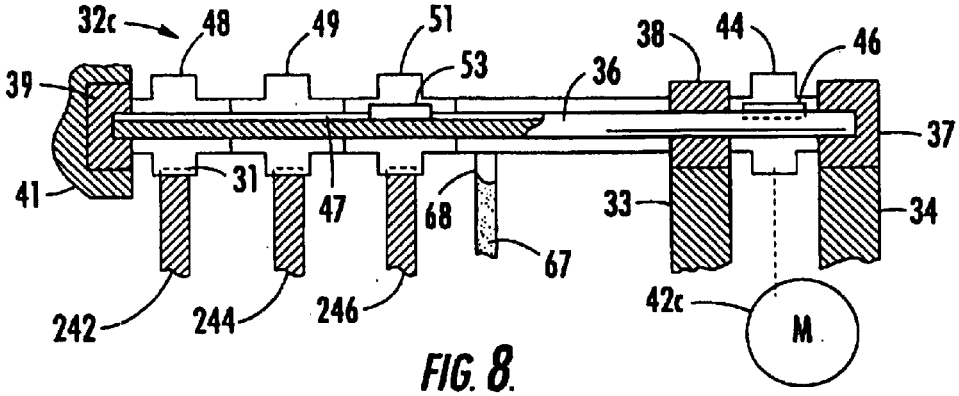
FIG. 8 is substantially a section view taken along line 8—8 of FIG. 5.

Referring to FIGS. 6, 7 and 8 in conjunction, each of the gear sets 32a, 32b and 32c has three wheel support gears disposed along the drive shaft 36 including a front support gear 48, an intermediate support gear 49 and a rear support gear 51. The front support gear 48 engages the teeth 31 of the first wheel 242, intermediate support gear 49 engages the teeth 31 of the second wheel 244, and the rear support gear 51 engages the teeth 31 of the third wheel 246. The support gears 48, 49, and 51 are of equal outer diameter in this example of the invention and are proportioned to abut against each other. A tubular sleeve 52 is disposed on each drive shaft 36 in coaxial relationship therewith and extends between bushing 38 and the rear support gear 51 to hold the support gears at the locations along the shaft at which they engage the wheels 242, 244, and 246.

Provided that the angular interval between successive ones of the three gear sets 32a, 32b, and 32c around the axis of rotation of the wheels 242, 244, and 246 is less than 180 degrees as previously described, the support gears 48, 49, and 51 act to hold each of the wheels in a centered relationship relative to the axis of rotation. The gear sets 32a, 32b, and 32c also function to rotate each of the wheels 242, 244, and 246. In particular as shown in FIG. 6, at gear set 32a the front support gear 48 is constrained to rotate with drive shaft 36 by an internal key 53 which seats in the drive shaft keyway slot 47. The other two support gears 49 and 51 at gear set 32a are idler gears that are free to rotate relative to the drive shaft 36. Thus, the first gear set 32a both supports and drives the first wheel 242 while serving only as a support for the other wheels 244 and 246.

At the second gear set 32b, as shown in FIG. 5, it is the intermediate support gear 49 that is constrained to rotate with drive shaft 36 by an internal key 53 while the front and rear support gears 48 and 51 are idler gears that may turn relative to the shaft. Thus, the second gear set 32b drives the second wheel 244 while also serving as a support for the other two wheels 242 and 246.

With reference to FIG. 8, at the third gear set 32c the rear support gear 51 is constrained to rotate with drive shaft 36 by an internal key 53 with the front and intermediate support gears 48 and 49 being free turning relative to the shaft. Accordingly, the third gear set drives the third wheel 246 while functioning as a support for the other two wheels 242 and 244.

Referring again to FIGS. 4 and 5, the wheels, wheel support, and drive mechanism are utilized by connectors 35 that extend from the annular front structural member 41 to the circular front support plate 33 and the assembly has a maximum diameter that enables insertion and withdrawal of the unitized mechanism through the opening 22. This facilitates assembly and repairing of the slot machine. The utilized mechanism is positioned at its back end by a support bracket 50 that extends from rear support plate 34 into a socket 55 that is secured to the rear wall of cabinet 21.

With continued reference to FIGS. 4 and 5, the wheel drive motors 42a, 42b, and 42c are preferably controlled by a microprocessor circuit, contained within a circuit housing 54, which maybe of the known design that is commonly used in conventional modern gaming devices. The motors 42a, 42b, and 42c are brake gear motors of the known stepping form which separately rotate each wheel 242, 244, and 246 through a predetermined number of angular increments that is determined by the control circuitry and which varies during successive games. Referring again to FIG. 2, the angular increment through which each wheel 242, 244, and 246 is traveled during each step of the rotary movement corresponds to the angular spacing of the centers of successive ones of the indicia 19 about the axis of rotation of the wheels. Thus, indicia 19 of each wheel 242, 244 and 246 are in alignment along radii of the axis of rotation when the motors stop turning the wheels. The presence of particular indicia 19 or combinations of indicia at a pay line at that time determines the player's winnings or score in the conventional manner.

Motor control circuits 54 which are microprocessor controlled require tracking of the rotary movement of the indicia carrying rotatable members by the microprocessor 56. For this purpose, tracking means 57 are provided for generating repetitive electrical signal pulses including first, second and third series of pulses each of which is indicative of rotary motion of a separate one of the wheels 242, 244 and 246. Successive pulses in each series are produced in response to successive increments of rotary motion of the wheel 242, 244, and 246 that is being tracked by the particular series. In a manner known to the art, this enables the microprocessor 56 to cause stopping of rotation of the members at times when indicia are in alignment at the pay line and, by counting the pulses, to determine which indicia are at the pay line.

The tracking means 57 of this example of the invention operates by photoelectric sensing of wheel motion. Means 57 includes a bracket 58 that extends forward from the front circular support plate 33, past the peripheries of each of the wheels 242, 244, and 246, and into the front structural member 41. Bracket 58 has pairs of spaced apart tangs 59 and the tangs of each pair extend along opposite sides of the gear teeth 31 of a separate one of wheels 242, 244, and 246. One tang 59 of each pair supports a small light source 61 positioned to direct light towards a light detector 62 supported by the other tang of the pair and which is at the other side of the gear teeth 31 of the wheels 242, 244, and 246 which extends between the pair of tangs. The light sources 61 may be of any of a variety of types such as light emitting diodes for example. The light detectors 62 may also be of any of a variety of different types, phototransistors and photodiodes being examples.

The gear teeth 31 of each wheel 242, 244, and 246 repetitively pass through the light path between the associated light source 61 and light detector 62. This causes the output signal of the detector 62 to switch repetitively between a high condition and a low condition thereby providing the desired series of rotary motion tracking signal pulses. For reasons to be hereinafter described, the wheels 242, 244 and 246 in their preferred form are made of translucent material. In instances where this results in an undesirably small variation of the light detector 62 outputs in response to the passage of gear teeth 31, the sides of the gear teeth can be coated with paint or other opaque material. It is also possible to situate the light sources 61 and detectors 62 at locations that are closer to the axis of rotation than the peripheral gear teeth 31. The wheels 242, 244 and 246 may then be provided with bands of light passages separated by relatively opaque areas that travel between the light sources 61 and light detectors 62 as the wheels turn.

Movement of the wheels 242, 244, and 246 in a direction parallel to the axis of rotation 16 is prevented by pads 63 that are secured to the ends of the tangs 59 of bracket 58. The pads 63 are preferably formed of a low friction resilient material such as felt. The pads 63 at each pair of tangs 59 extend towards and bear against the sides of the wheels 242, 244 and 246 that extends between that pair of tangs. A pair of similar brackets 58a and 58b having pads 63 extend from the front circular support plate 33 to restrain axial movement of the wheels 242, 244 and 246 at additional locations which are angularly spaced apart around the axis of rotation 16 of the wheels. The brackets 58, 58a, and 58b of this particular example of the invention are at 120 degree angular intervals around the axis of rotation 16.

The example of the invention described above with reference to FIGS. 1 to 8 embodies a highly advantageous mechanism for supporting and driving the indicia carrying rotatable wheels 242, 244 and 246. Both functions, supporting and driving, are effected with simple gear sets situated at the periphery of the disks. This eliminates the complex and bulky telescoped shafting and other components at the axis of rotation of the wheels that has heretofore been present in gaming devices of this general type. The rim drive also makes it possible to include open centered rotating wheels which need not extend to the axis of rotation thereby enabling viewing of indicia bands of progressively smaller diameter that are spaced apart along the axis of rotation of the wheels. The wheel support and drive mechanism in the preferred form is easily removable from the slot machine cabinet as a unit to facilitate repairs.

Figure 9:
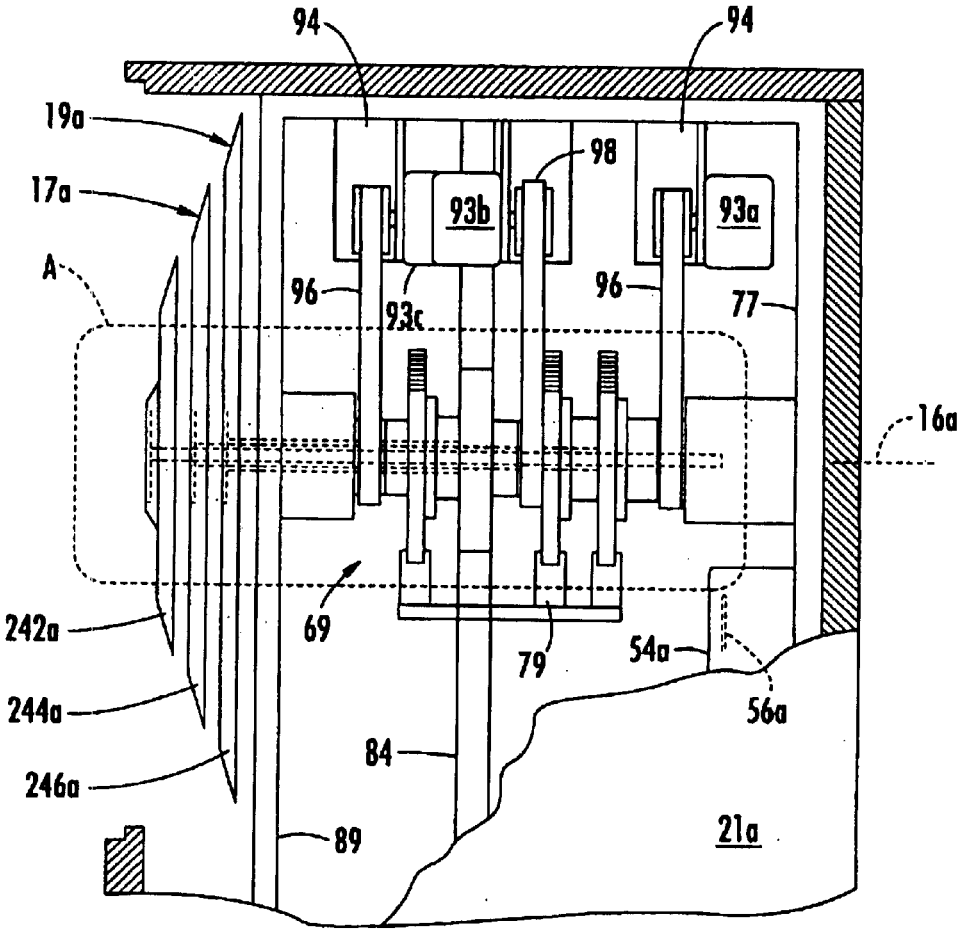
FIG. 9 is substantially a broken out side view of a second embodiment of the drive system for one group of the multi-wheel game of FIG. 1.
Figure 10:
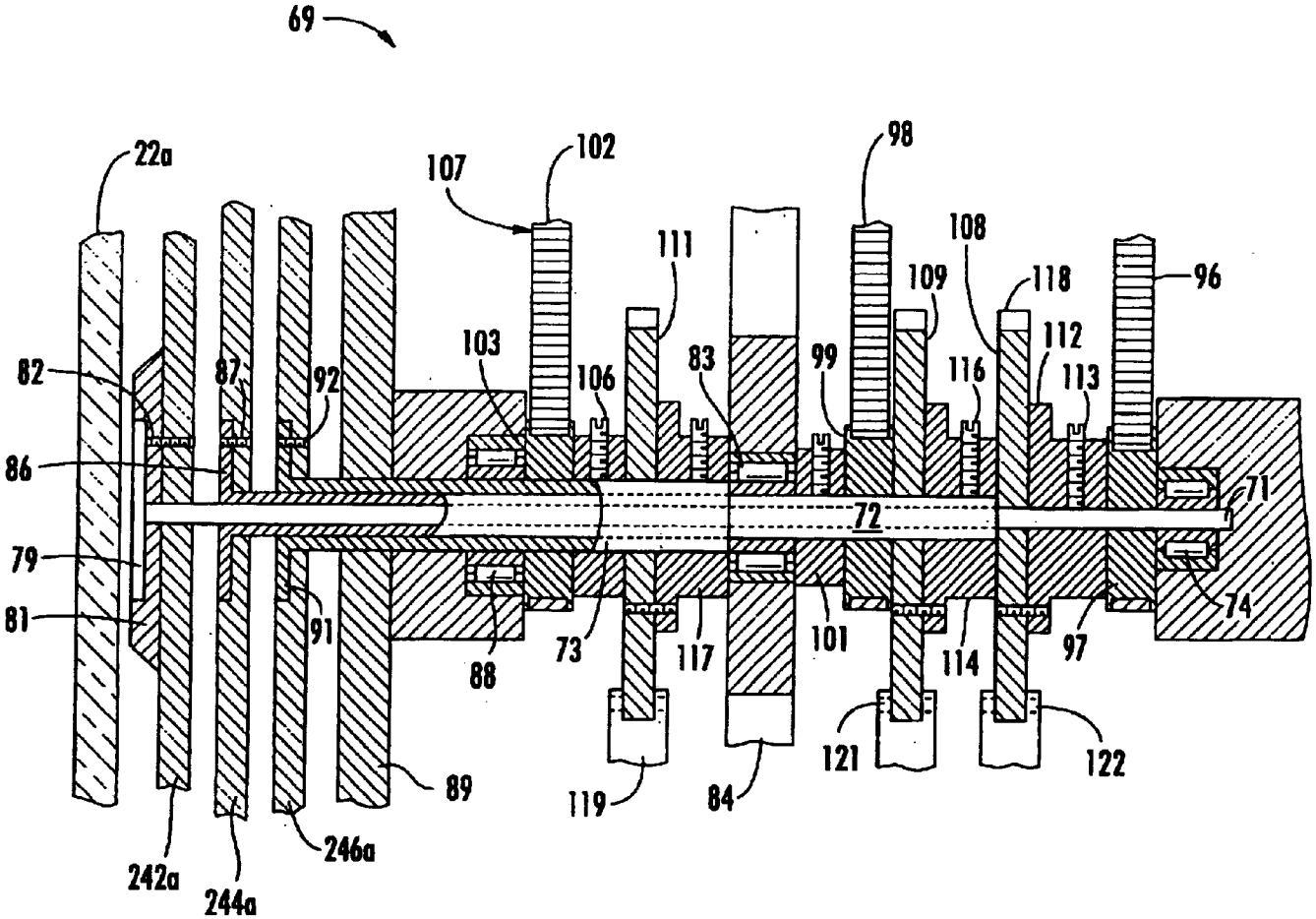
FIG. 10 is substantially a vertical section view of the portion of the mechanism of FIG. 9 that is enclosed by dashed line A thereof.

While the rim driven construction discussed above constitutes the preferred form of the invention, certain novel features of the previously described embodiment can advantageously be embodied in multi-wheel machines that have center shafting for the purpose of supporting and driving the wheels. This includes, for example, axial spacing of the rotating bands of indicia to provide a three dimensional aspect to the indicia array as viewed by the player. Referring jointly to FIGS. 9 and 10, the wheels 242a, 244a, and 246a of this embodiment are flat circular plates that are spaced apart along a common axis of rotation 16a. The wheels 242a, 244a, and 246a have progressively greater outside diameters thereby enabling viewing of an annular region 17a of the front surface of each of the disks by a player who situated in front of the slot machine that regions are at the radially outermost portions of the disks. Annular bands of indicia 19a of the previously described kind are imprinted on the regions 17a of the wheels. An interesting effect is created if the annular regions 17a of the wheels 242a, 244a, and 246a are beveled surfaces so that the indicia 19a of the three wheels are in a coplanar or near coplanar relationship.

Wheels 242a, 244a, and 246a are supported and separately rotated by a drive system 69 that includes three coaxial drive shafts 71, 72 and 73 of progressively shorter length. The back end of the inner drive shaft 71 extends out of intermediate drive shaft 72 and is supported by a first bearing 74 that is secured to one arm 76 of internal framing 77 within the slot machine cabinet 21a. The front end of inner drive shaft 71 also extends out of the intermediate drive shaft 72 and has a flange 79 seated in a conforming opening in a circular cap 81 that is in front of the first wheel 242a. Screws 82 extend through the front disk 13a and cap 81 and engage in flange 79 thereby constraining the wheel to rotate with the inner drive shaft.

A second bearing 83, supported by another framing arm 84, supports the intermediate drive shaft 72 at a location that is forward from the back end of the drive shaft 72. A flange 86 at the front end of the intermediate drive shaft 72 seats in a conforming opening in the second wheel 244a and is secured to that disk by additional screws 87. The outer drive shaft 73 is supported at an intermediate location along the drive shaft by a third bearing 88 that is secured to another arm 89 of the cabinet framing 77. A flange 91 at the front end of the outer drive shaft 73 seats in a conforming opening in the third wheel 246a and screws 92 secure the wheel 246a to the flange.

First wheel 242a, second wheel 244a and third wheel 246a are driven by separate electrical motors 93a, 93b and 93c respectively, motor 93c being behind motor 93b as seen in FIG. 9. The motors 93a, 93b, and 93c are secured to brackets 94 which extend from framing 77. Referring again to FIGS. 9 and 10 in conjunction, motor 51 is coupled to the inner drive shaft 71 by a drive belt 96 which engages a pulley 97 that is keyed to the inner drive shaft at a location adjacent to bearing 74. Another drive belt 98 couples motor 93b to the intermediate drive shaft 72 by engaging another pulley 99 that is keyed to the intermediate drive shaft at a location that is between bearings 74 and 83. An annular collar 101 on intermediate drive shaft 72 extends between pulley 99 and bearing 83 to prevent movement of the pulley along the shaft. The third motor 93c is coupled to outer drive shaft 73 by a third drive belt 102 which engages another pulley 103 that is keyed to the outer drive shaft at a location immediately behind the third bearing 88. Another annular collar 104 is adjacent to pulley 103 and is held in place by a setscrew 106 to prevent axial movement of the pulley along the shaft. Drive belts 96, 98 and 102 are preferably of the non-slip type which have teeth 107 that engage conforming grooves in the pulleys on which they are engaged.

Motors 93a, 93b, and 93c are brake gear motors of the stepping type similar to those of the previously described embodiment of the invention and function in a similar manner to rotate each wheel 242a, 244a, and 246a through a predetermined number of angular increments that is determined by the control circuit 54a.

Three circular timer plates 108, 109, and 111 enable microprocessor tracking of the rotary movement of the wheels 242a, 244a, and 246a in the previously described manner. Timer plate 108 is disposed in coaxial relationship with inner drive shaft 71 at a location between pulleys 97 and 99 and is secured to an adjacent annular collar 112 that is constrained to rotate with the inner drive shaft by a setscrew 113. Timer plate 109 is disposed on intermediate drive shaft 73 in coaxial relationship therewith at a location between timer plate 108 and pulley 99 and is secured to another annular collar 114 that is constrained to rotate with the intermediate drive shaft by another setscrew 116. The third timer plate 111 is situated between pulley 103 and bearing 83, in coaxial relationship with the outer drive shaft 73, and is constrained to rotate therewith by another annular collar 117.

The circular rim of each of the timer plates 108, 109, and 111 is indented by a series of notches 118 which have an angular spacing relative to the axis of rotation that corresponds to the hereinbefore described angular increment of rotary motion of the wheels 242a, 244a, and 246a. A separate one of three photoelectric sensors 119 is disposed at the rim of each timer plate 108, 109 and 111 and may be of one of the known types which have a small light source 121 such as a light emitting diode for example and a light detector 122 such as a phototransistor for example that produces an electrical signal in response to light from the source. The light sources 121 and detectors 122 are at opposite sides of the rims of the timer plates 108, 109 and 111 at which notches 118 are located thereby causing light to be transmitted from the sources 121 to the detectors 122 each time that a notch passes between the two. Thus, each sensor transmits an electrical pulse to the control circuit housing 54a each time that the associated timer plate 108, 109 or 111 is stepped through the above described angular increment of motion by the associated drive motor 93a, 93b, or 93c. As previously described, this enables the microprocessor 56a to cause stopping of the rotation of the wheels 242a, 244a, and 246a at times when indicia are in alignment at the pay line and, by counting the pulses, to determine which indicia are at the pay line.

Components of the embodiment illustrated by FIGS. 9 and 10 that are not depicted therein may be similar to those of the previously described embodiment of the invention.

Figure 12:
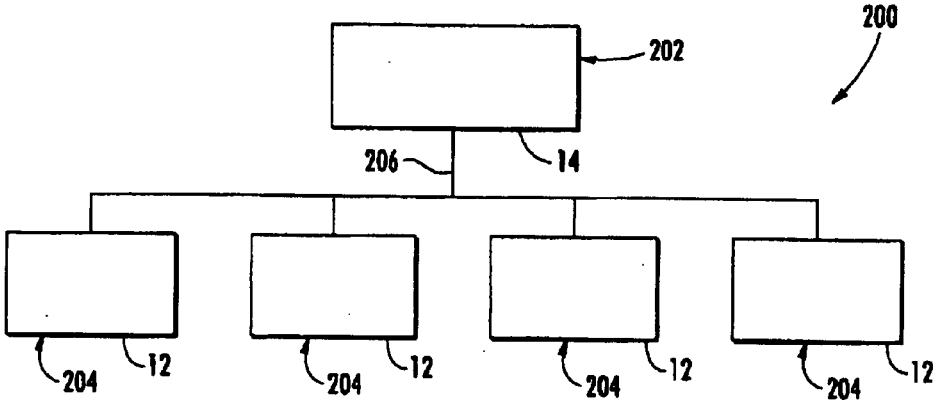
FIG. 12 is substantially a diagram of a network setup of the multi-wheel game of FIG. 1.

FIG. 12 illustrates a networked system 200 of the present invention in which a single separate display unit 202 containing a plurality of wheels may be linked to one or more game devices 204. Game devices 204 may contain any of a large variety of games arid game displays. Each game device 404 is linked to display unit 202 by a communication device 206. Communication device 406 may use many different communication protocols and systems, such as Ethernet communication protocols, network cards, and cables.

In this embodiment, adjustments may be made to the method of the present invention to allow a plurality of game devices 204 to use a single display unit 202. When one of the game devices 204 produces a wheel spinning event, a signal is transmitted to display unit 202. If display unit 202 is currently working to generate a display for another wheel spinning event, the signal or information in the signal may be placed in a queue or memory device. When display unit 204 is free to respond to a new wheel spinning event, the signal is received, processed, and display unit 204 spins the wheels. The method would then continue as previously discussed.

In order to avoid confusion among players, system 200 may comprise a means for indicating which game device 204 is currently interacting with display unit 202. The indicating means may comprise a video display or lighted sign on display unit 202 that displays indicia, such as a number, that indicates the currently interacting game device 204. A display, such as a video display or lighted sign, may also be placed on game device 204 for conveying similar information to the player. For example, when the player has qualified to spin the wheels of display unit 202 but the display unit is working on an event for another player, the display may communicate this to the player. When it is the player's turn, the display so informs the player.

System 200 may be adapted for use with progressive jackpots. Display unit 202 may include a progressive jackpot meter that displays the current value of the jackpot in a way that is well known in the art. Players may win the progressive jackpot as a result of obtaining a predefined outcome on display unit 202, game device 204, or a combination of both.

It should be noted that although a clover-shaped game is described for the preferred embodiment, any shape may be utilized with the multi-wheel concept. In addition, the present game is not limited to three groups of wheels with each group having three wheels. Any number of groups, one or greater, may be utilized with each group having any number of wheels, one or greater.

Conclusion

Although the description above contains many specifications, these should not be construed as limiting the scope of the invention but as merely providing illustrations of some of presently preferred embodiments of this invention. For example, the description of the drive mechanism should not be construed as limiting the scope of the present invention to the structures and devices described therein. Many other drive mechanisms may be used that would still fall within the scope of the present invention. Thus, the scope of the invention should be determined by the appended claims and their legal equivalents rather than by the examples given.

What is claimed is:

1. A gaming device for use by at least one game player for playing a game of chance, the gaming device comprising:

(A) a plurality of separate groups of rotatable wheels, each group having a plurality of rotatable wheels, each of said wheels having a viewable annular surface;

(B) at least one indicia formed on each of said viewable annular surfaces of each of said wheels;

(C) at least one pay line, the pay line indicating a line along at least two of said groups, to indicate a group of indicia; and (D) a drive mechanism, the drive mechanism being adapted to rotate the plurality of wheels and stop the wheels in a position wherein the occurrence a predetermined combination of the indicia on the pay line indicates a winning combination.

2. The gaming device of claim 1 wherein the drive mechanism is adapted to stop the wheels in positions that are randomly determined.

3. The gaming device of claim 1 wherein the drive mechanism is adapted to stop the wheels in positions, the positions being within a finite number of predetermined stopping positions.

4. The gaming device of claim 1 further comprising bet sensors, the bet sensors being adapted to detect when a bet is placed on the pay line.

5. The gaming device of claim 1 further comprising an indicator device adapted to allow a player to indicate a wager on the pay line.

6. The gaming apparatus of claim 1 wherein said wheels are concentric.

7. The gaming apparatus of claim 1 further comprising a first group, a second group, and a third group of the wheels.

8. The gaming apparatus of claim 7 wherein each of the groups comprises three of said wheels.

9. The gaming apparatus of claim 8 wherein said first payline, said second payline and said third payline together form an isosceles triangle.

10. The game table apparatus of claim 9 wherein said table is approximately clover shaped.

11. The gaming apparatus of claim 1 wherein the wheels are mounted on a table.

12. The gaming apparatus of claim 8 wherein said groups are arranged in an approximate clover formation.

13. The gaming apparatus of claim 12 further comprising a first pay line extending between the centers of said first group and said second group, a second pay line extending between the centers of said second group and said third group, and a third pay line extending between the centers of said third group and said first group.

14. The game table apparatus of claim 13 wherein said groups are arranged in an approximate clover formation.

15. The game apparatus of claim 14 wherein said wheels are displayed via an electronic display device.

16. The game apparatus of claim 14 further comprising a plurality of groups of said plurality of concentric rotatable wheels, said at least one pay line further defined from said inner most surface of a first group to said inner most surface of a second group.

17. The gaming apparatus of claim 11 further comprising a payline that incorporates all the wheels.

18. A game table apparatus for use by at least one game player for playing a game of chance, the game table apparatus comprising:

(A) a table;

(B) three groups of rotatable wheels carried by said table, each of said three groups having three concentric said wheels, each of said wheels having a viewable annular surface;

(C) a plurality of indicia formed on each of said viewable annular surfaces of each of said wheels;

(D) at least one pay line indicating a line along at least two of said groups; and (E) means for rotating and stopping said wheels, (F) wherein the aligned combination of predetermined said indicia along said pay line indicates a winning combination.

19. A method of playing a game of chance, comprising the steps of:

(A) placing a position bet;

(B) spinning at least two separate groups of concentric wheels each group of concentric wheels having indicia on a viewable annular surface, each of said group of concentric wheels having at least two wheels therein;

(C) stopping, randomly, said spinning wheels;

(D) evaluating aligned indicia extended along at least two of said groups of concentric wheels at predetermined locations to determine winnings based on preselected combinations and pay ratios; and (E) paying said winnings.

20. A gaming apparatus for playing a game of chance, comprising:

(A) a plurality of separate groups of concentric and rotatable wheels, each group of concentric wheels having a viewable annular surface, each group comprising an inner concentric wheel having a first viewable surface identified as an inner most viewable surface and an outer concentric wheel having a second viewable surface identified as an outer most viewable surface;

(B) indicia located on each said viewable annular surface; and (C) at least one pay line extending along at least two separate groups of concentric wheels.

21. A gaming apparatus for playing a game of chance, comprising:

(A) A plurality of separate groups of rotatable wheels each group comprising a first wheel and a second wheel, each having a viewable annular surface;

(B) Indicia located on each said viewable annular surface; and (C) A plurality of pay lines, extending along the viewable annular surface on said first wheel to a viewable annular surface on said second wheel on said first group of wheels, to a viewable annular surface on said second wheel to a viewable annular surface on said first wheel on said second group of wheels.

22. The game apparatus of claim 21 wherein said wheels are displayed via a video display device.

* * * * *